US011206323B2

(12) United States Patent
Liao

(10) Patent No.: US 11,206,323 B2
(45) Date of Patent: Dec. 21, 2021

(54) METHOD FOR DETERMINING RELATIVE POSITIONS OF DUAL SCREENS, DISPLAY CONTROL METHOD AND TERMINAL

(71) Applicant: ZTE CORPORATION, Guangdong (CN)

(72) Inventor: Pinzhen Liao, Guangdong (CN)

(73) Assignee: ZTE CORPORATION, Shenzhen (CN)

(*) Notice: Subject to any disclaimer, the term of this patent is extended or adjusted under 35 U.S.C. 154(b) by 183 days.

(21) Appl. No.: 16/634,090

(22) PCT Filed: Jul. 4, 2018

(86) PCT No.: PCT/CN2018/094429
§ 371 (c)(1),
(2) Date: Jan. 24, 2020

(87) PCT Pub. No.: WO2019/019883
PCT Pub. Date: Jan. 31, 2019

(65) Prior Publication Data
US 2020/0213431 A1 Jul. 2, 2020

(30) Foreign Application Priority Data
Jul. 25, 2017 (CN) .......................... 201710612576.7

(51) Int. Cl.
*G06F 1/16* (2006.01)
*H05K 5/00* (2006.01)
(Continued)

(52) U.S. Cl.
CPC ........ *H04M 1/0243* (2013.01); *G06F 3/0346* (2013.01); *G06F 3/0487* (2013.01);
(Continued)

(58) Field of Classification Search
CPC .... G06F 1/1616; G06F 1/1618; G06F 1/1652; G06F 3/0346; G06F 3/0487; H04M 1/0243; H04M 1/72454; H04M 1/0214
See application file for complete search history.

(56) References Cited

U.S. PATENT DOCUMENTS

| | | | |
|---|---|---|---|
| 8,508,433 B2* | 8/2013 | Manning | G06F 1/1618 345/1.3 |
| 8,749,484 B2* | 6/2014 | de Paz | G06F 3/1423 345/156 |

(Continued)

FOREIGN PATENT DOCUMENTS

| | | |
|---|---|---|
| CN | 101076043 A | 11/2007 |
| CN | 101788850 A | 7/2010 |

(Continued)

OTHER PUBLICATIONS

WIPO, International Search Report dated Sep. 3, 2018.
China Patent Office, First Office Action dated Aug. 27, 2020 for corresponding Chinese application 201710612576.7.

*Primary Examiner* — Anthony M Haughton

(57) ABSTRACT

Disclosed is a method for determining relative positions of dual screens, suitable for a dual-screen foldable terminal in which two screens of the terminal are provided with at least two types of sensors, respectively. The method includes: collecting data of each sensor on the two screens, respectively; simulating data of a target virtual sensor according to the data collected on each screen; and determining an included angle between the two screens according to the data of the target virtual sensor corresponding to the two screens. Further disclosed are a display control method and a dual-screen foldable terminal. By means of the present disclosure, an included angle between the two screens can be accurately measured so as to control the display.

16 Claims, 8 Drawing Sheets

(51) Int. Cl.
    *H05K 7/00*           (2006.01)
    *H04M 1/02*           (2006.01)
    *G06F 3/0346*        (2013.01)
    *G06F 3/0487*        (2013.01)
    *G06F 9/445*          (2018.01)
    *H04M 1/72454*      (2021.01)

(52) U.S. Cl.
    CPC .......... *G06F 9/445* (2013.01); *H04M 1/0214*
    (2013.01); *H04M 1/72454* (2021.01); *H04M*
    *2250/12* (2013.01); *H04M 2250/16* (2013.01);
    *H04M 2250/22* (2013.01)

(56) References Cited

U.S. PATENT DOCUMENTS

| | | | | |
|---|---|---|---|---|
| 9,213,365 | B2* | 12/2015 | Sirpal | G06F 3/044 |
| 9,476,704 | B2* | 10/2016 | Choi | G01B 21/22 |
| 9,489,078 | B2* | 11/2016 | Seo | G06F 3/04817 |
| 9,612,621 | B2* | 4/2017 | Lee | G06F 1/1652 |
| 9,684,342 | B2 | 6/2017 | Kim et al. | |
| 9,992,888 | B2* | 6/2018 | Moon | H05K 5/0226 |
| 10,175,721 | B2* | 1/2019 | Sun | G06F 3/017 |
| 10,409,415 | B2* | 9/2019 | Sakabe | G06F 1/1647 |
| 10,591,988 | B2* | 3/2020 | Liao | G06F 3/04815 |
| 10,915,285 | B2* | 2/2021 | Dong | G06F 1/1677 |
| 10,951,253 | B2* | 3/2021 | Kim | H04B 1/3827 |
| 11,068,074 | B2* | 7/2021 | Lee | H04M 1/0214 |
| 2007/0268264 | A1 | 11/2007 | Aarras et al. | |
| 2010/0182265 | A1 | 7/2010 | Kim et al. | |
| 2015/0212647 | A1 | 7/2015 | Kim et al. | |

FOREIGN PATENT DOCUMENTS

| | | |
|---|---|---|
| CN | 103680471 A | 3/2014 |
| CN | 104750169 A | 7/2015 |
| CN | 104991798 A | 10/2015 |
| CN | 105721638 A | 6/2016 |
| CN | 106502602 A | 3/2017 |
| CN | 101076043 A | 11/2017 |

* cited by examiner

METHOD FOR DETERMINING RELATIVE POSITIONS OF DUAL SCREENS, DISPLAY CONTROL METHOD AND TERMINAL

TECHNICAL FIELD

The present disclosure relates to, but is not limited to, the field of communication technologies, in particular to a method for determining relative positions of dual screens, a display control method and a dual-screen foldable terminal.

BACKGROUND

Recent smart terminal market has been occupied by bar devices for a long time, which causes aesthetic fatigue to people. Therefore, flip phones, especially dual-screen flip phones, have returned to people's view. For a common flip device (with a touch screen and a physical keyboard), the screen needs to be turned off after the cover is closed, which requires to know relative positions of the upper cover plate and the lower cover plate. For a dual-screen flip device, the relative positions of the two screens need to be known in order to push different display contents to the two screens. Currently, the manufacturers usually use the following methods.

A method is realized by respectively arranging a Hall device and a magnet on the two plates, and when the two plates are closed or opened, the Hall device will report a response state. However, in the above method, a layout position of the Hall device is very important. The Hall device will become too sensitive if arranged too close to the rotation shaft; but will fail to respond in time if arranged too far away from the rotation shaft. For example, if a common flip device is closed quickly, a wrong touch will occur once a more protruding key is pressed. Meanwhile, the Hall device can only report two states, i.e., an approaching state and a distancing state, but cannot obtain the relative positions of the two plates accurately. For example, for a flip dual-screen phone, there are only two states, closed and open. Normally, the relative positions of the two screens are (indicated by an included angle): 0 to 360°, but the Hall device can only display a state of being closed at about 0° or 360° in the left-right direction, or open at other angles. Therefore, it is not accurate enough to determine the relative positions.

Another method includes arranging an acceleration sensor on each of the two plates, and calculating an included angle between the two plates by reading the measured data. This method is generally applicable only to stationary products such as a notebook computer, but is not applicable to smart terminals, because a smart terminal may be in motion all the time in use. Therefore, the data obtained by the measurement of the acceleration sensor consists of the gravitational acceleration and a motion acceleration of the terminal, which makes the calculated angle rather inaccurate and greatly influences the user experience.

SUMMARY

The present disclosure provides a method for determining relative positions of dual screens, a display control method and a dual-screen foldable terminal for accurately measuring an included angle between two screens so as to control the display and improve user experience.

In a first aspect of the disclosure, there is provided a method for determining relative positions of dual screens, suitable for a dual-screen foldable terminal in which two screens of the terminal are provided with at least two types of sensors, respectively, the method including: collecting data of each sensor on the two screens, respectively; simulating data of a target virtual sensor according to the data collected on each screen; and determining an included angle between the two screens according to the data of the target virtual sensor corresponding to the two screens.

Optionally, the at least two types of sensors are selected from an acceleration sensor, a gyroscope, and a geomagnetic sensor.

Optionally, the target virtual sensor includes any one of an RV sensor, a GAME RV sensor, and a G-sensor.

A display control method is provided, suitable for a dual-screen foldable terminal in which two screens of the terminal are provided with at least two types of sensors, respectively. The method includes: collecting data of each sensor on the two screens, respectively; simulating data of a target virtual sensor according to the data collected on each screen; determining an included angle between the two screens according to the data of the target virtual sensor corresponding to the two screens; and controlling a display content on the two screens according to a value of the included angle.

Optionally, the step of controlling the display content on the two screens according to the value of the included angle includes: taking, under the condition that it is determined that one of the screens is placed in a horizontal state, the horizontally placed screen as a virtual keyboard and the other screen as a display screen in response to the value of the included angle in a first range, performing a split screen display on the two screens, or combining the two screens into one screen to display the same content in response to the value of the included angle is in a second range, and closing the screens and a touch system in response to the value of the included angle smaller than a threshold value.

Optionally, the sensor includes at least an acceleration sensor and a gyroscope, and the virtual sensor includes one or two of: an RV sensor, a GAME RV sensor, and a G-sensor.

In a second aspect of the disclosure, there is provided a dual-screen foldable terminal, in which two screens of the terminal are provided with at least two types of sensors, respectively, the terminal including: a collection module configured to collect data of each sensor on the two screens, respectively; a simulation module configured to simulate data of a target virtual sensor according to the data collected on each screen; and a determination module configured to determine an included angle between the two screens according to the data of the target virtual sensor corresponding to the two screens.

Optionally, the at least two types of sensors may be selected from an acceleration sensor, a gyroscope, and a geomagnetic sensor.

Optionally, the virtual sensor includes any one of: an RV sensor, a GAME RV sensor, and a G-sensor.

Optionally, the terminal further includes: a control module configured to control a display content on the two screens according to a value of the included angle.

Optionally, the control module is configured to control the display content on the two screens according to the value of the included angle by: taking, under the condition that it is determined that one of the screens is placed in a horizontal state, the horizontally placed screen as a virtual keyboard and the other screen as a display screen in response to the value of the included angle in a first range, performing a split screen display on the two screens or combining the two screens into one screen to display the same content in response to the value of the included angle in a second range, and closing the screens and a touch system in response to the value of the included angle smaller than a threshold value.

In a third aspect of the disclosure, there is provided a dual-screen foldable terminal, including a memory, a processor, and a computer program stored in the memory and executable on the processor, wherein two screens of the terminal are provided with at least two types of sensors respectively, and the processor, when executing the program, implements steps of: collecting data of each sensor on the two screens, respectively; simulating data of a target virtual sensor according to the data collected on each screen; and determining an included angle between the two screens according to the data of the target virtual sensor corresponding to the two screens.

Optionally, the processor, when executing the program, further implements a step of: controlling a display content on the two screens according to a value of the included angle.

In summary, the embodiments of the present disclosure provide a method for determining relative positions of dual screens, a display control method and a dual-screen foldable terminal that can accurately measure an included angle between two screens to control the display based on the accurately measured screen included angle, thereby providing user experience.

DETAILED DESCRIPTION

For clarity and better understanding of the objects, technical solution and advantages of the disclosure, embodiments of the disclosure will be described in detail below in conjunction with the accompanying drawings. It should be noted that the embodiments of the disclosure and features therein may be combined with each other in any manner as long as they are not contradictory.

Embodiment I

Figure 1:
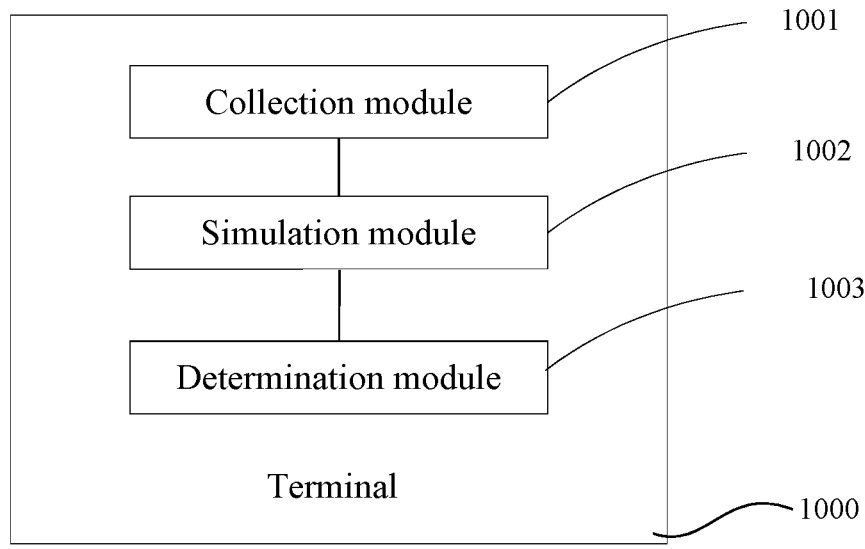
FIG. 1 is a schematic diagram of a terminal according to a first embodiment of the present disclosure.

This embodiment of the disclosure mainly relates to a foldable terminal in which at least two different types of sensors, such as an acceleration sensor, a gyroscope, a geomagnetic sensor, and a sensor with a virtual orientation fused through an algorithm, such as a rotation vector (RV) sensor, a game rotation vector (GAME RV) sensor, and a gravity sensor (G-sensor), are provided on two screens of the terminal of the embodiment. FIG. 1 is a schematic diagram of a terminal according to the embodiment. As shown in FIG. 1, a terminal 1000 according to the embodiment includes a collection module 1001, a simulation module 1002 and a determination module 1003.

The collection module 1001 is configured to collect data of each sensor on the two screens, respectively.

The simulation module 1002 is configured to simulate data of a target virtual sensor according to the data collected on each screen.

The determination module 1003 is configured to determine an included angle between the two screens according to the data of the two data virtual sensors.

In this embodiment, the gyroscope is configured to measure a rotation angular velocity of an object; the acceleration sensor is configured to measure a real-time acceleration of an object, which is generally a superposition of the gravitational acceleration and a motion acceleration; and the geomagnetic sensor may be configured to include other orientation sensors for determining a direction.

In this embodiment, by means of fusing at least two different types of sensors among an acceleration sensor, a gyroscope sensor, a geomagnetic sensor and other sensors, a virtual sensor can be simulated, and through the virtue sensors, included angles of two screens and a horizontal plane can be accurately calculated. This method does not simply depend on the acceleration sensor, but eliminates the influence of a linear motion component of the phone on the calculation result through the fusion of different types of sensors, thereby accurately calculating the included angle between the dual screens of the phone, and thus solving the problem that the angle calculation has a larger error due to the influence of the motion acceleration of the phone because the prior art depends greatly on the acceleration sensor. The simulation virtual sensor has been applied mainly in the game field before, and the implementations thereof are not described in detail here; however, how to design and implement a virtual sensor in a dual-screen phone and use it to accurately determine an included angle between two screens is still blank in the industry, and is firstly proposed by the inventor of the disclosure.

With the terminal of the embodiment, relative positions of two screens can be accurately measured, and the user experience can be greatly improved. For a dual-screen display project, many application scenarios can be derived by accurately measuring the included angle between the two screens, and the user experience can be improved.

Embodiment II

Figure 2:
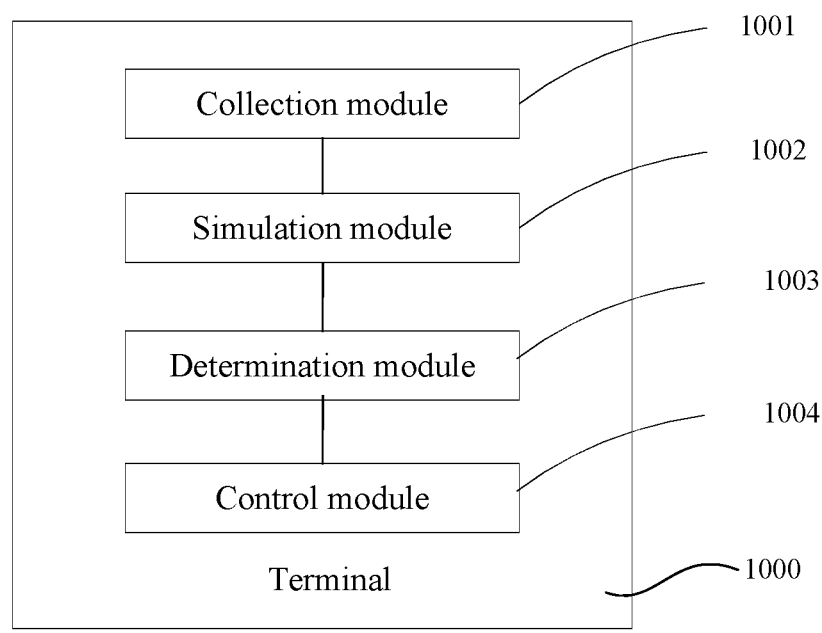
FIG. 2 is a schematic diagram of a terminal according to a second embodiment of the present disclosure.

The difference between this embodiment and the first embodiment is that, as shown in FIG. 2, the terminal of this embodiment further includes a control module 1004.

The control module 1004 is configured to control a display content on the two screens according to a value of the included angle.

The phenomenon of mistaken touch of keys is easy to occur when a common flip phone is closed, resulting in some inexplicable problems. With the dual-screen foldable terminal of the embodiment, however, different contents can be displayed according to different relative positions of the dual screens, which cannot be realized or cannot be accurately realized by conventional schemes.

In this embodiment, there is further provided a dual-screen foldable terminal, including a memory, a processor, and a computer program stored in the memory and executable on the processor. Two screens of the terminal are provided with at least two different types of sensors respectively, and the processor, when executing the program, implements the steps of:

collecting data of each sensor on the two screens, respectively;

simulating data of a target virtual sensor according to the data collected on each screen; and determining an included angle between the two screens according to the data of the target virtual sensor corresponding to the two screens. The target virtual sensor here may be determined according to the design requirements of the product before leaving the factory, or may be specified by the designer, or may be designed to include several optional target virtual sensors to be selected by the user, which is not limited herein.

Embodiment III

Figure 3:
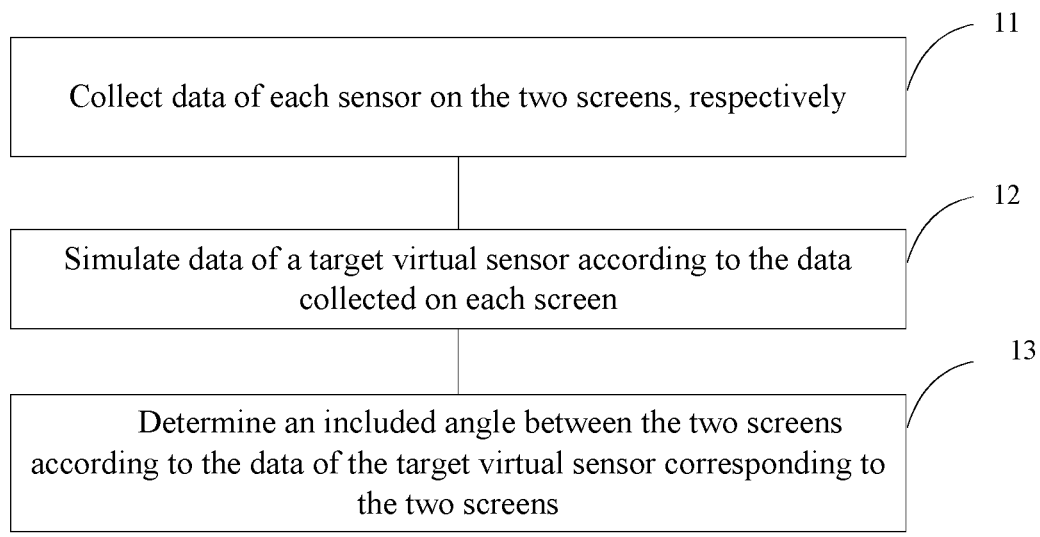
FIG. 3 is a flowchart of a method for determining relative positions of dual screens according to a third embodiment of the present disclosure.

FIG. 3 is a flowchart of a method for determining relative positions of dual screens of the embodiment. The method of the embodiment is suitable for a dual-screen foldable terminal in which two screens of the terminal are provided with at least two different types of sensors respectively, and as shown in FIG. 3, includes the following steps 11 to 13.

At step 11, data of each sensor on the two screens is collected, respectively.

At step 12, data of a target virtual sensor is simulated according to the data collected on each screen.

At step 13, an included angle between the two screens is determined according to the data of the target virtual sensor corresponding to the two screens.

In this embodiment, a plurality of different types of sensors are fused through an algorithm to simulate one virtual sensor, through which included angles of two screens and a horizontal plane can be accurately calculated.

With the terminal of the embodiment, relative positions of two screens can be accurately measured, and the user experience can be greatly improved. For a dual-screen display project, many application scenarios can be derived by accurately measuring the included angle between the two screens, and the user experience can be improved.

Embodiment IV

Figure 4:
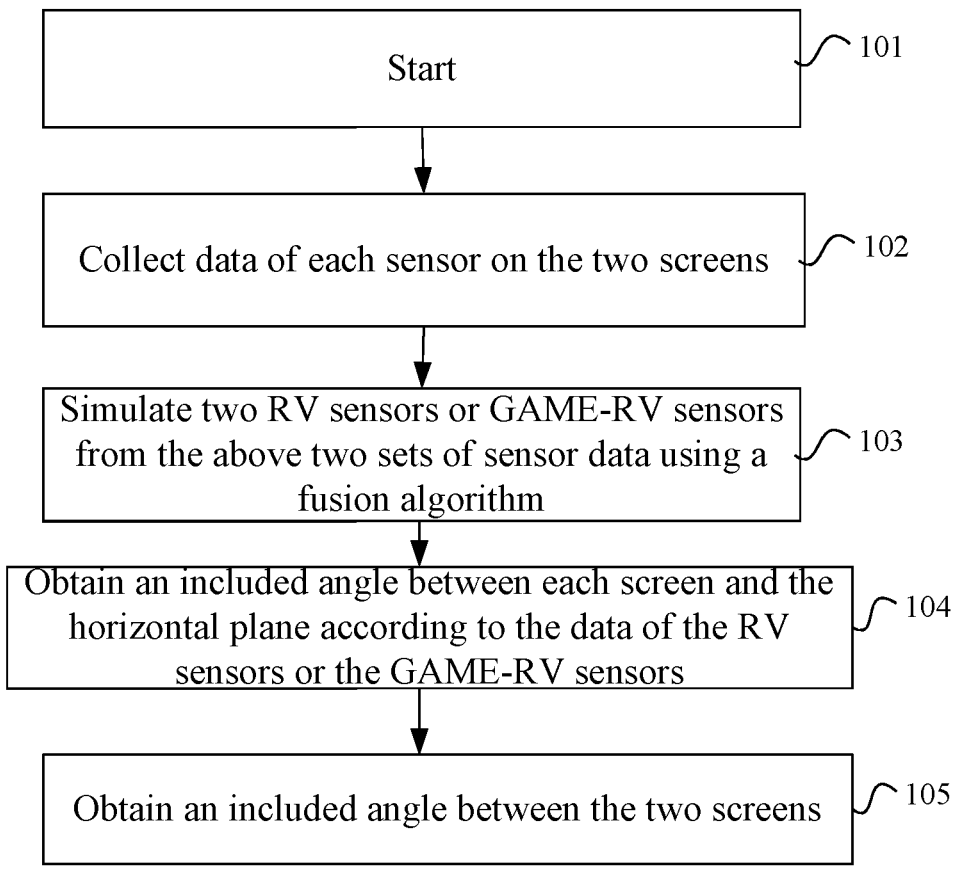
FIG. 4 is a flowchart of a method for determining relative positions of dual screens according to a fourth embodiment of the present disclosure.

This embodiment is described by simulating the data of multiple types of sensors as an RV sensor or a GAME-RV sensor as an example. As shown in FIG. 4, the method of the embodiment includes the following steps 101 to 105.

At step 101: The method starts.

At step 102: data of each sensor on the two screens is collected.

In this embodiment, data collected by the acceleration sensor and the gyroscope is necessary, while data collected by the geomagnetic sensor is optional.

At step 103: two RV sensors or GAME-RV sensors are simulated from the above two sets of sensor data using a fusion algorithm.

At step 104: an included angle between each screen and the horizontal plane is obtained according to the data of the RV sensors or the GAME-RV sensors.

Since the data of the RV sensors or the GAME-RV sensors themselves contain angle information, the included angle between the screen and the horizontal plane can be obtained simply by properly processing the data of the sensors.

For example, if the RV sensor value of one screen is reported to be 0.3, and the RV sensor value of the other screen is reported to be −0.4, then the included angle between the first screen and the horizontal plane (forward) is: 180°−0.3*180°=126°, and the included angle between the second screen and the horizontal plane (forward) is 180°−(−0.4*180°)=252°.

At step 105: an included angle between the two screens is obtained.

In this embodiment, the included angle between the two screens is |252°−126°|=126°.

Embodiment V

Figure 5:
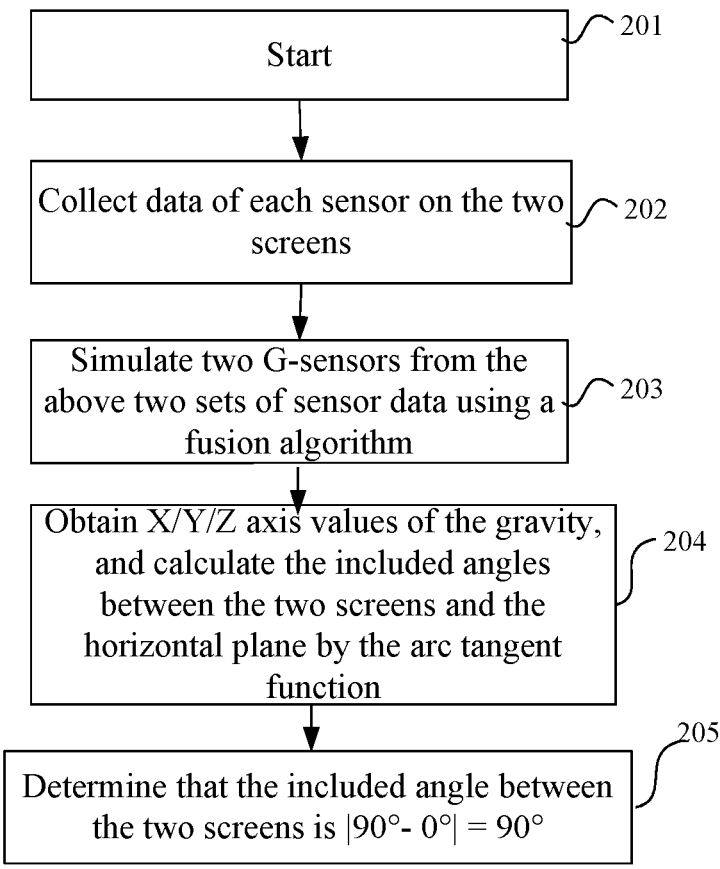
FIG. 5 is a flowchart of a method for determining relative positions of dual screens according to a fifth embodiment of the present disclosure.

This embodiment is described by simulating the data of multiple types of sensors as a G-sensor as an example. As shown in FIG. 5, the method of the embodiment includes the following steps 201 to 205:

At step 201: The method starts.

At step 202: data of each sensor on the two screens are collected.

In this embodiment, data collected by the acceleration sensor and the gyroscope are necessary, while data collected by the geomagnetic sensor are optional.

At step 203: two G-sensors are simulated from the above two sets of sensor data using a fusion algorithm.

At step 204: X/Y/Z axis values of the gravity are obtained, and the included angles between the two screens and the horizontal plane are calculated by the arc tangent function.

For example, if the first plate has X=0, Y=0, and Z=9.8, and the second plate has X=9.8, Y=0, and Z=0, then the included angle between the first plate and the horizontal plane (forward) is: arctan (0)=0°, and the included angle between the second plate and the horizontal plane (forward) is 180°−(arctan(1))=90°.

At step 205: the included angle between the two screens is determined to be |90°−0°|=90°.

Embodiment VI

Figure 6:
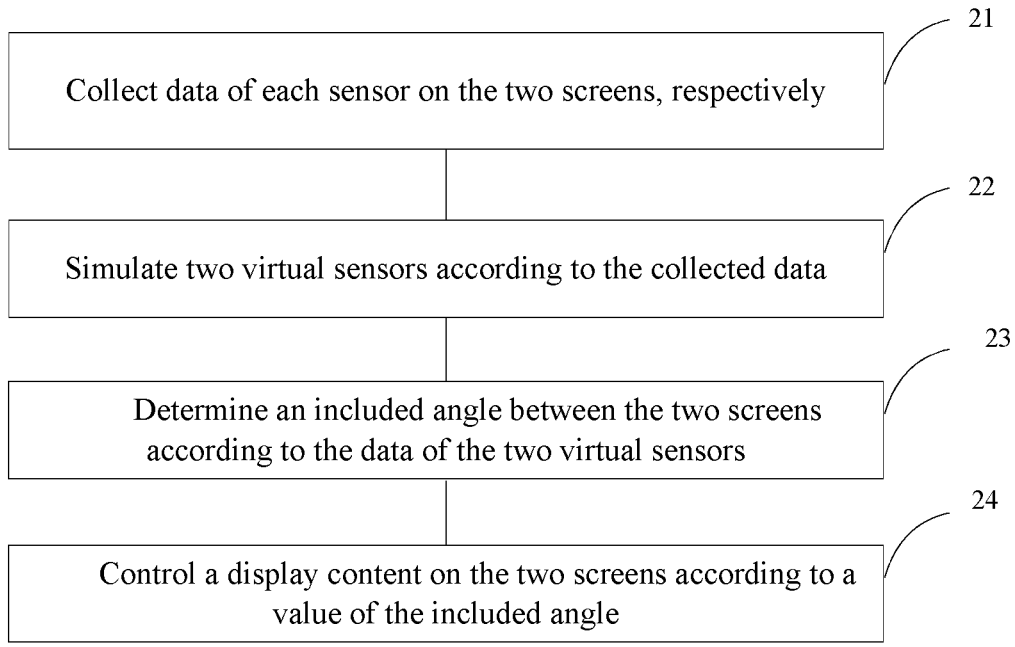
FIG. 6 is a flowchart of a display control method according to a sixth embodiment of the present disclosure.

FIG. 6 is a flowchart of a display control method according to the embodiment. The method of the embodiment is suitable for a dual-screen foldable terminal in which two screens of the terminal are provided with at least two different types of sensors, respectively. As shown in FIG. 6, the method includes the following steps 21 to 24:

at step 21, respectively collecting data of each sensor on the two screens;

at step 22, respectively simulating two virtual sensors according to the collected data;

at step 23, determining an included angle between the two screens according to the data of the two virtual sensors; and at step 24, controlling a display content on the two screens according to a value of the included angle.

The phenomenon of mistaken touch of keys easily occurs when a common flip phone is closed, resulting in some inexplicable problems. The dual-screen foldable terminal of the embodiment, however, is capable of controlling the display of different contents according to different relative positions of the dual screens, which cannot be realized or cannot be accurately realized by conventional schemes.

Embodiment VII

Figure 7:
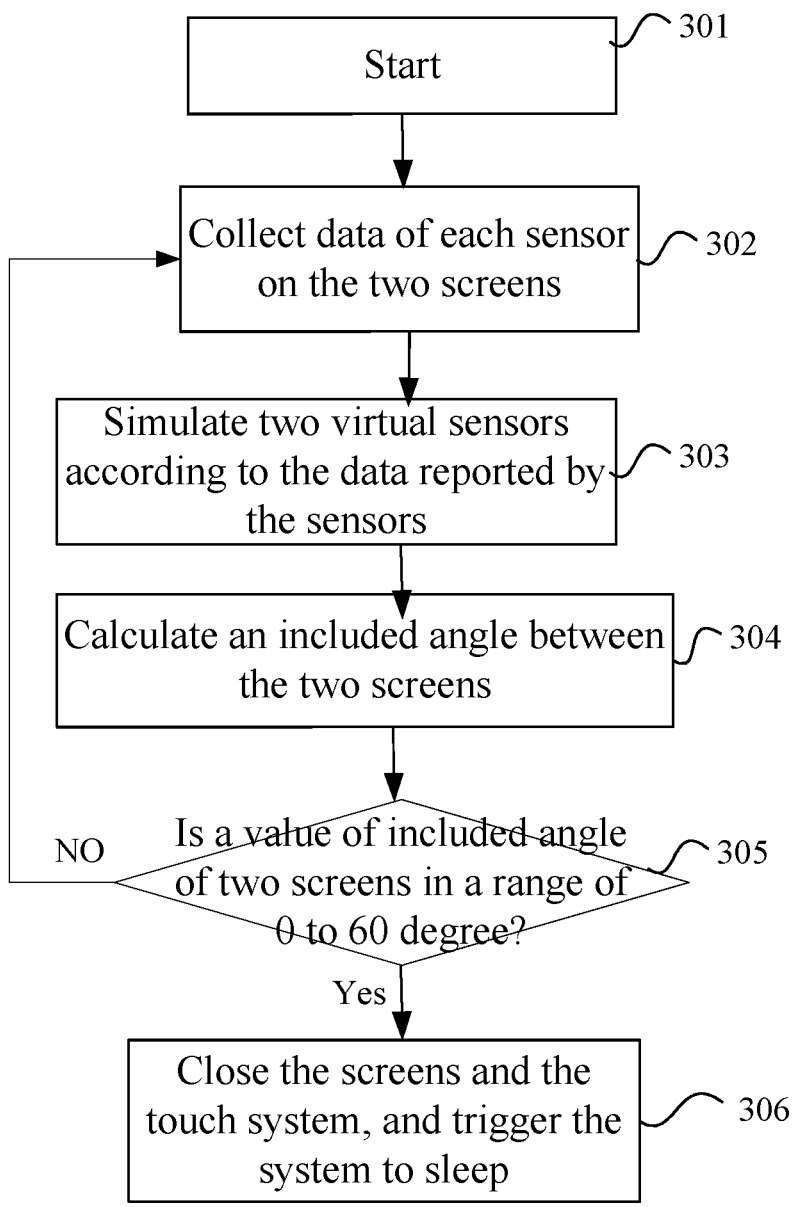
FIG. 7 is a flowchart of a display control method according to a seventh embodiment of the disclosure.

This embodiment is an application example of controlling the terminal to turn off the screen and sleep. As shown in FIG. 7, the method includes the following steps 301 to 306.

At step 301: The method starts.

At step 302: data of each sensor on the two screens are collected.

At step 303: two virtual sensors are simulated according to the data reported by the sensors. The virtual sensor here includes: one or more of an RV sensor, a GAME RV sensor, a G-sensor, etc.

At step 304, an included angle between the two screens is calculated.

Since the RV sensor and the GAME RV sensor themselves contain angle values, the included angles of the two screens can be calculated by directly calculating a difference of the angles. The G-sensor, however, needs to calculate the included angle between each screen and the horizontal plane or the vertical plane first, and then calculates the included angle between the two screens through conversion.

At step 305, it is determined whether the value of the included angle is smaller than a certain threshold value which is typically between 0° and 60°, and if yes, continue to step 306; otherwise, return to step 302.

At step 306, the screens and the touch system are closed, and the system is triggered to sleep.

Embodiment VIII

Figure 8:
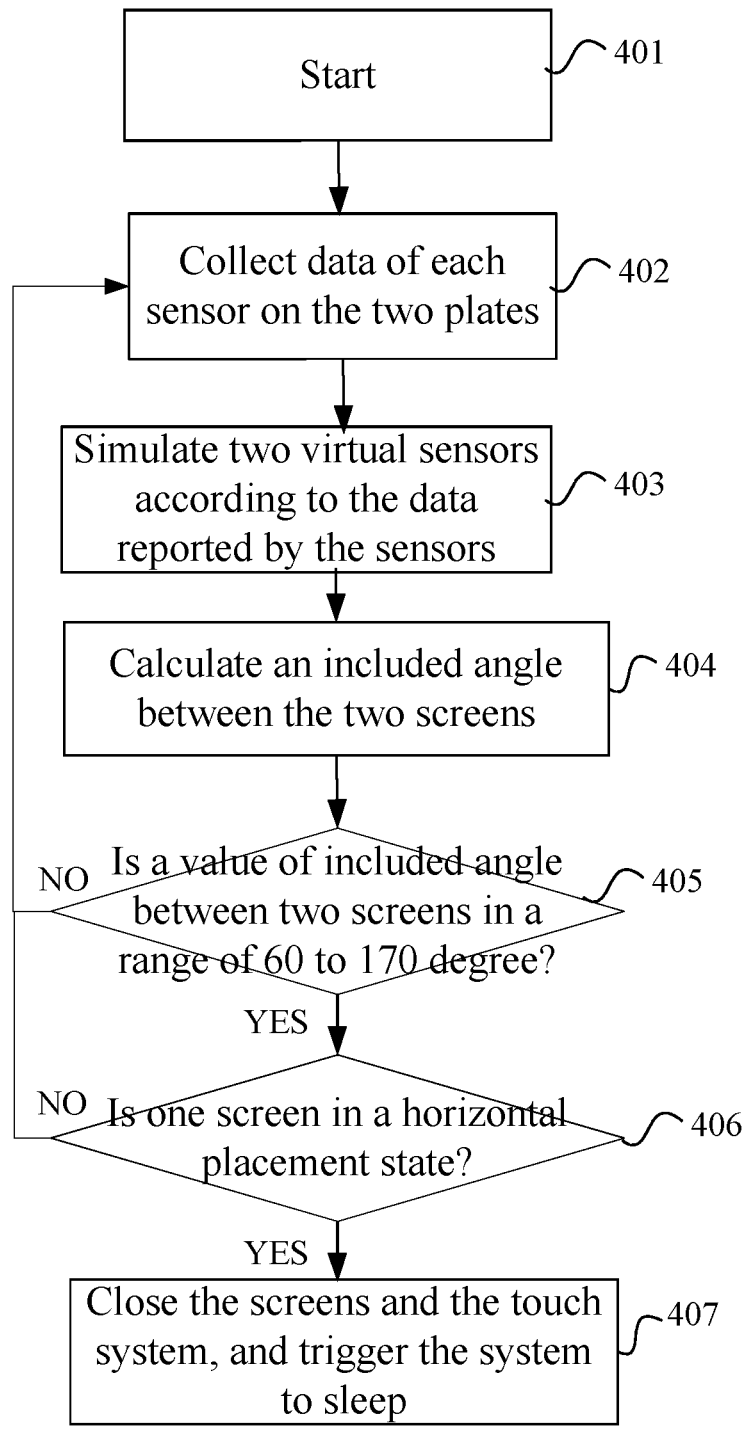
FIG. 8 is a flowchart of a display control method according to an eighth embodiment of the disclosure.

This embodiment is an application example of simulating PC. As shown in FIG. 8, the method includes the following steps 401 to 407.

At step 401: The method starts.

At step 402: data of each sensor on the two plates are collected.

At step 403: two virtual sensors are simulated according to the data reported by the sensors. The virtual sensor here includes: one or more of an RV sensor, a GAME RV sensor, a G-sensor, etc.

At step 404: an included angle between the two screens is calculated.

Since the RV sensor and the GAME RV sensor themselves contain angle values, the included angles of the two screens can be calculated by directly calculating a difference of the angles. The G-sensor, however, needs to calculate the included angle between each screen and the horizontal plane or the vertical plane first, and then calculates the included angle between the two screens through conversion.

At step 405: it is determined whether a value of the included angle of the two screens is in a certain range which is typically 60° to 170°, and if yes, continue to step 406; otherwise, return to step 402.

At step 406: it is determined whether one screen is in a horizontal placement state, and if yes, proceed to step 407, otherwise, retune to step 402.

At step 407: the horizontally placed screen is simulated as a keyboard, while the other screen is still in display function, thereby simulating a small notebook.

Embodiment IX

Figure 9:
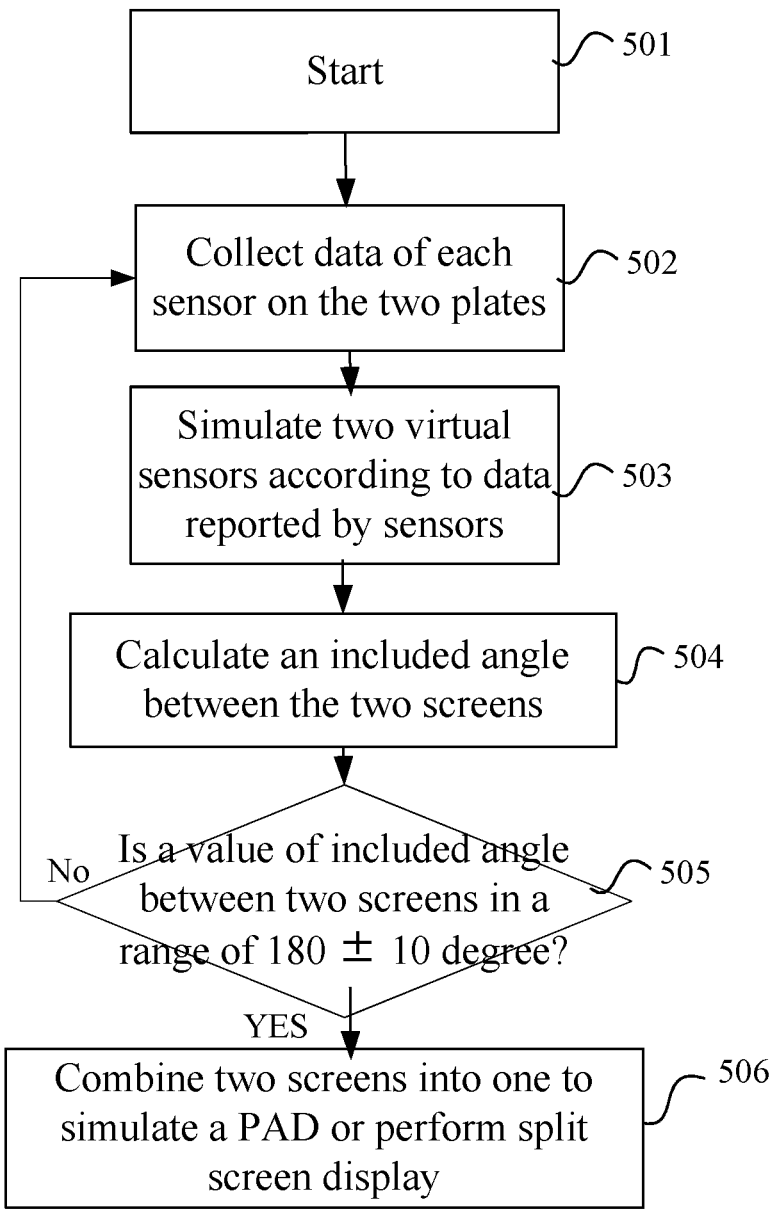
FIG. 9 is a flowchart of a display control method according to a ninth embodiment of the disclosure.

This embodiment is an application example of simulating a PAD or split screen. As shown in FIG. 9, the method includes the following steps 501 to 506.

At step 501: The method starts.

At step 502: data of each sensor on the two screens are collected.

At step 503: two virtual sensors are simulated according to the data reported by the sensors. The virtual sensor here includes: one or more of an RV sensor, a GAME RV sensor, a G-sensor, etc.

At step 504: an included angle between the two screens is calculated.

Since the RV sensor and the GAME RV sensor themselves contain angle values, the included angles of the two screens can be calculated by directly calculating a difference of the angles. The G-sensor, however, needs to calculate the included angle between each screen and the horizontal plane or the vertical plane first, and then calculates the included angle between the two screens through conversion.

At step 505: it is determined whether a value of the included angle of the two screens is in a certain range which is typically 180°±10°, and if yes, proceed to step 506; otherwise, return to step 502.

At step 506: the two screens are combined into one to simulate a PAD, or split screen display is performed, where each screen displays different applications.

For example, one of the screens displays an interface of grabbing lucky envelope on WeChat, and the other displays a video interface.

Embodiment X

Figure 10:
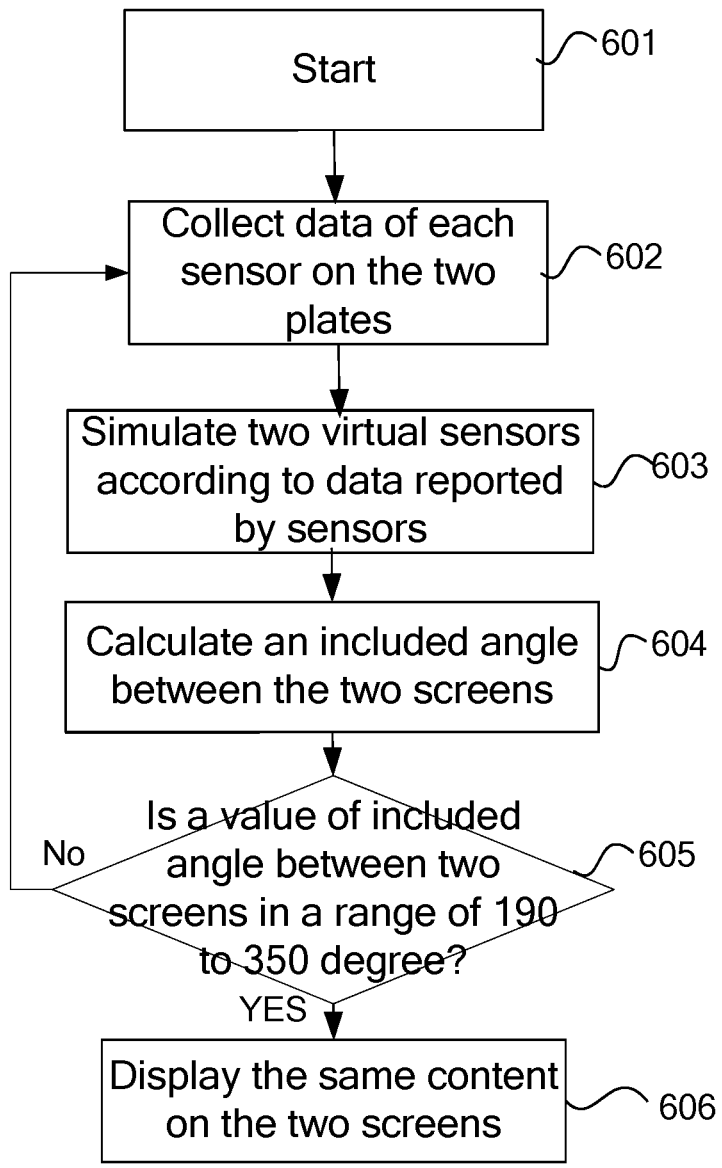
FIG. 10 is a flowchart of a display control method according to a tenth embodiment of the present disclosure.

This embodiment is an application example of simulating 360° display. As shown in FIG. 10, the method includes the following steps 601 to 606.

At step 601: start.

At step 602: data of each sensor on the two plates are collected.

At step 603: two virtual sensors are simulated according to the data reported by the sensors. The virtual sensor here includes: one or more of an RV sensor, a GAME RV sensor, a G-sensor, etc.

At step 604: an included angle between the two screens is calculated.

Since the RV sensor and the GAME RV sensor themselves contain angle values, the included angles of the two screens can be calculated by directly calculating a difference of the angles. The G-sensor, however, needs to calculate the included angle between each screen and the horizontal plane or the vertical plane first, and then calculates the included angle between the two screens through conversion.

At step 605: it is determined whether the included angle of the two screens is in a certain range which is typically 190° to 350°, and if yes, proceed to step 606; otherwise, retune to step 602.

At step 606: the two screens display the same content to achieve 360-degree display.

For example, the two screens both play the same video.

Embodiment XI

Figure 11:
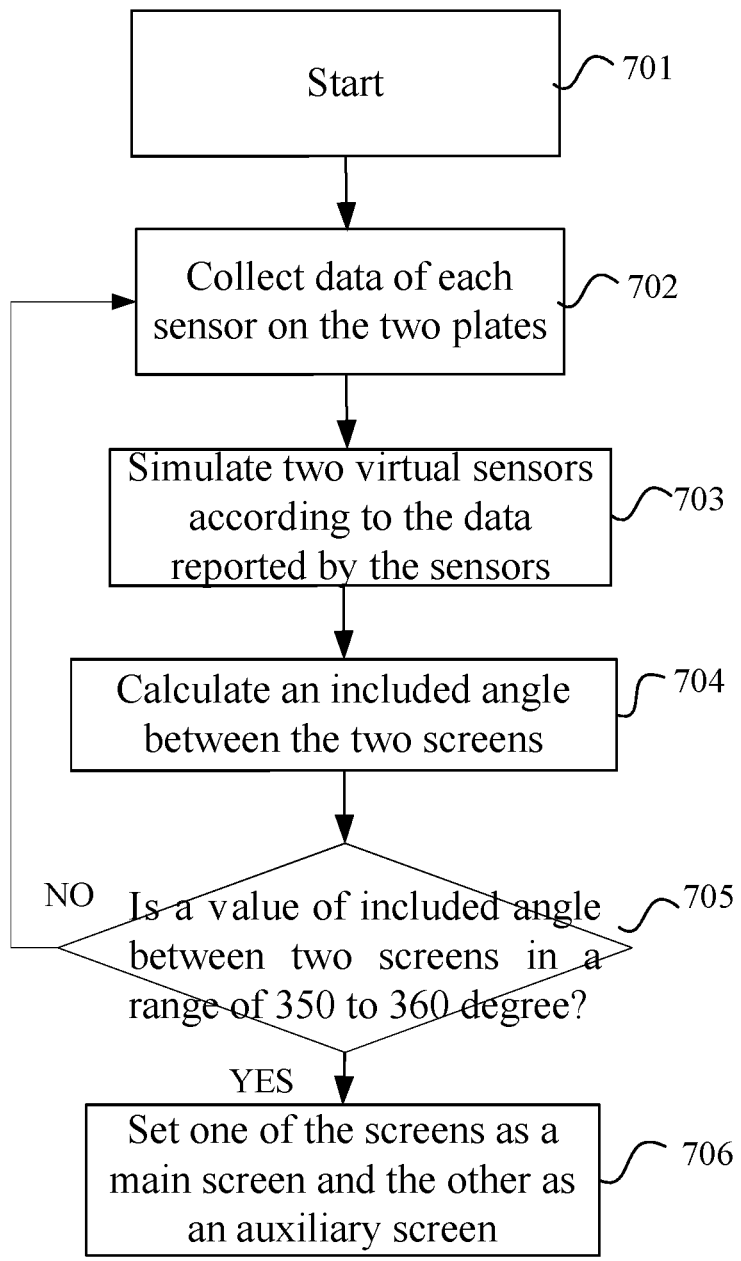
FIG. 11 is a flowchart of a display control method according to an eleventh embodiment of the present disclosure.

This embodiment is an application example of displaying on main and auxiliary screens. As shown in FIG. 11, the method includes the following steps 701 to 706.

At step 701: the method starts.

At step 702: data of each sensor on the two plates are collected.

At step 703: two virtual sensors are simulated according to the data reported by the sensors. The virtual sensor here includes: one or more of an RV sensor, a GAME RV sensor, a G-sensor, etc.

At step 704: an included angle between the two screens is calculated.

Since the RV sensor and the GAME RV sensor themselves contain angle values, the included angles of the two screens can be calculated by directly calculating a difference of the angles. The G-sensor, however, needs to calculate the included angle between each screen and the horizontal plane or the vertical plane first, and then calculates the included angle between the two screens through conversion.

At step 705: it is determined whether a value of the included angle of the two screens is in a certain range which is typically 350° to 360°, and if yes, proceed to step 706; otherwise, return to step 702.

At step 706: one of the screens is set as a main screen, and the other is set as an auxiliary screen.

The angle ranges in the above embodiments are not fixed, but are given as examples here. The angle ranges may be modified by a user according to the specific application. Therefore, any specific operation performed through the angle value shall fall in the protection scope of the present disclosure.

In an embodiment of the present disclosure, there is further provided a computer readable storage medium having a computer executable instruction stored thereon which, when executed, causes the method for determining relative positions of dual screens and the display control method to be implemented.

One of ordinary skill in the art will appreciate that all or part of the steps described above may be implemented by a program stored in a computer readable storage medium for instructing the associated hardware, such as a read-only memory, a magnetic or optical disk, and the like. Optionally, all or part of the steps of the above embodiments may be implemented using one or more integrated circuits. Accordingly, each module/unit in the above embodiments may be implemented in the form of hardware, or may be implemented in the form of a software functional module. The present disclosure is not limited to any particular form of combination of hardware and software.

The foregoing are merely preferred embodiments of the present disclosure. Apparently, it should be noted that the present disclosure may have many other embodiments, and those skilled in the art may make various corresponding changes and variations according to the present disclosure without departing from the spirit and essence of the present disclosure, but these corresponding changes and variations shall fall within the protection scope of the claims appended to the present disclosure.

What is claimed is:

1. A method for determining relative positions of dual screens, suitable for a dual-screen foldable terminal in which two screens of the terminal are provided with at least two types of sensors, respectively, the method comprising:
    collecting data of each sensor on the two screens, respectively;
    simulating data of a target virtual sensor according to the data collected on each screen using a fusion algorithm; and
    determining an included angle between the two screens according to the data of the target virtual sensor corresponding to the two screens.

2. The method of claim 1, wherein the at least two types of sensors are selected from an acceleration sensor, a gyroscope, and a geomagnetic sensor.

3. The method of claim 1, wherein
    the target virtual sensor comprises any one of: a rotation vector sensor, a game rotation vector sensor, and a gravity sensor.

4. A dual-screen foldable terminal, comprising a memory, a processor, and a computer program stored in the memory and executable on the processor, wherein two screens of the terminal are provided with at least two different types of sensors, respectively, and the processor, when executing the program, implements the method of claim 1.

5. The terminal of claim 4, wherein: the processor, when executing the program, further implements a step of:
    controlling a display content on the two screens according to a value of the included angle.

6. A computer storage medium storing an executable instruction therein, the executable instruction being configured to implement the method of claim 1.

7. A display control method, suitable for a dual-screen foldable terminal in which two screens of the terminal are provided with at least two types of sensors, respectively, the method comprising:
    collecting data of each sensor on the two screens, respectively;
    simulating data of a target virtual sensor according to the data collected on each screen;
    determining an included angle between the two screens according to the data of the target virtual sensor corresponding to the two screens; and
    controlling a display content on the two screens according to a value of the included angle.

8. The method of claim 7, wherein the step of controlling the display content on the two screens according to the value of the included angle comprises:
    taking, under the condition that it is determined that one of the screens is placed in a horizontal state, the horizontally placed screen as a virtual keyboard and the other screen as a display screen in response to the value of the included angle in a first range;
    performing a split screen display on the two screens or combining the two screens into one screen to display the same content in response to the value of the included angle in a second range; and
    closing the screens and a touch system in response to the value of the included angle smaller than a threshold value.

9. The method of claim 7, wherein
    the sensor comprises at least an acceleration sensor and a gyroscope, and
    the virtual sensor comprises one or two of a rotation vector sensor, a game rotation vector sensor, and a gravity sensor.

10. A dual-screen foldable terminal, comprising a memory, a processor, and a computer program stored in the memory and executable on the processor, wherein two screens of the terminal are provided with at least two different types of sensors, respectively, and the processor, when executing the program, implements the method of claim 7.

11. A computer storage medium storing an executable instruction therein, the executable instruction being configured to implement the method of claim 7.

12. A dual-screen foldable terminal, in which two screens of the terminal are provided with at least two types of sensors, respectively, the terminal comprising:
    a collection module configured to collect data of each sensor on the two screens, respectively;

a simulation module configured to simulate data of a target virtual sensor according to the data collected on each screen; and a determination module configured to determine an included angle between the two screens according to the data of the target virtual sensor corresponding to the two screens.

13. The terminal of claim 12, wherein the at least two types of sensors are selected from an acceleration sensor, a gyroscope, and a geomagnetic sensor.

14. The terminal of claim 12, wherein the target virtual sensor comprises any one of: a rotation vector sensor, a game rotation vector sensor, and a gravity sensor.

15. The terminal of claim 12, wherein the terminal further comprises:

a control module configured to control a display content on the two screens according to a value of the included angle.

16. The terminal of claim 15, wherein the control module is configured to control the display content on the two screens according to the value of the included angle, by taking, under the condition that it is determined that one of the screens is placed in a horizontal state, the horizontally placed screen as a virtual keyboard and the other screen as a display screen in response to the value of the included angle in a first range; performing a split screen display on the two screens or combining the two screens into one screen to display the same content in response to the value of the included angle in a second range; and closing the screens and a touch system in response to the value of the included angle smaller than a threshold value.

* * * * *